Feb. 26, 1929.

S. BUTMAN, JR 1,703,721

GRAIN HEADER

Filed July 14, 1927

INVENTOR.
Samuel Butman, Jr.
BY
Geo. P. Kimmel
ATTORNEY.

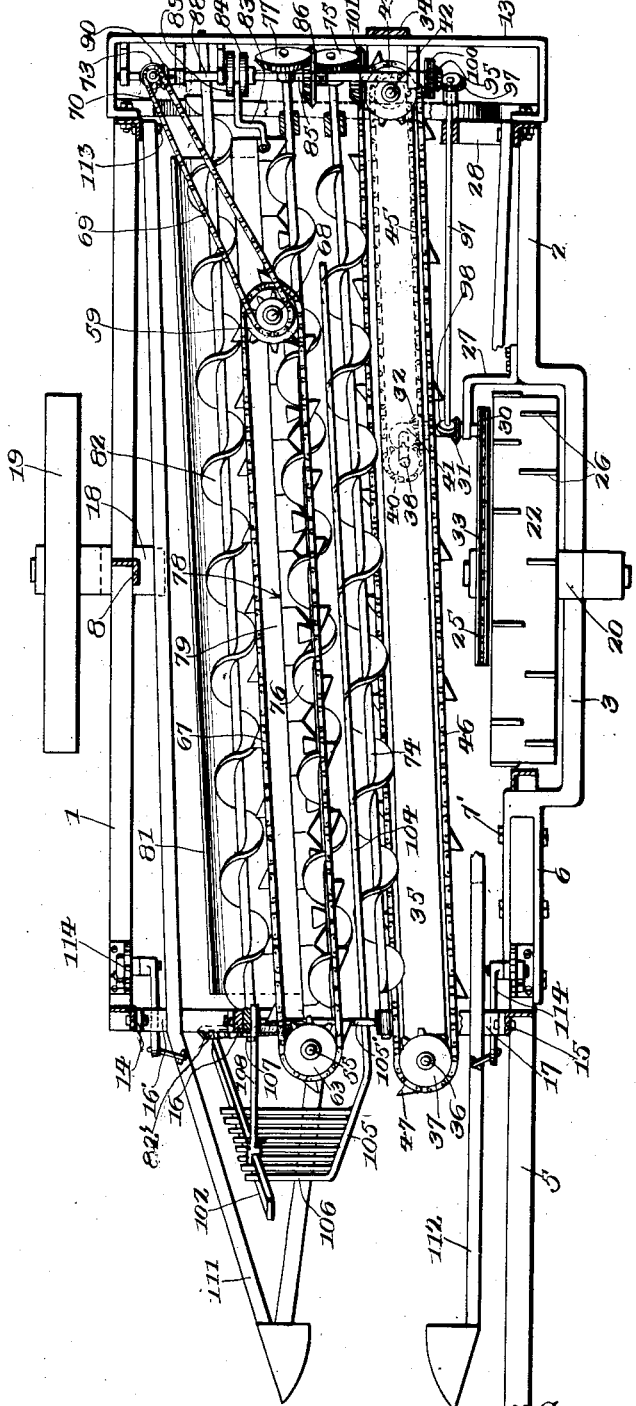

Feb. 26, 1929.
S. BUTMAN, JR
1,703,721
GRAIN HEADER
Filed July 14, 1927    4 Sheets-Sheet 3
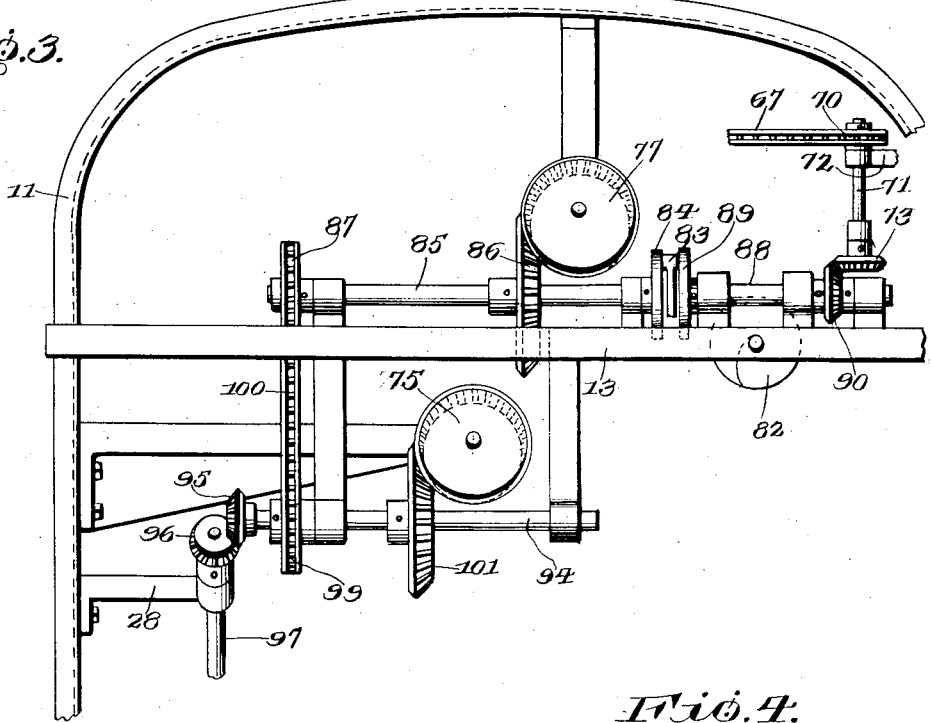
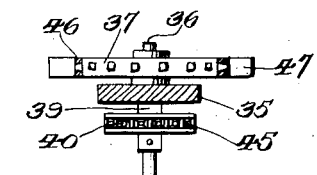
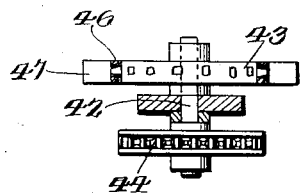
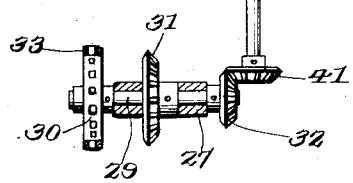
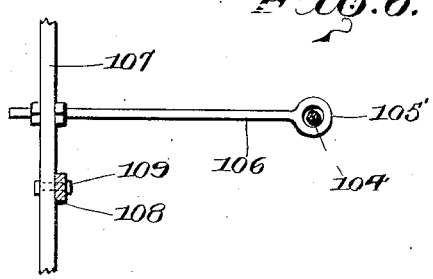
INVENTOR.
Samuel Butman, Jr.
BY
Geo. P. Kimmel
ATTORNEY.

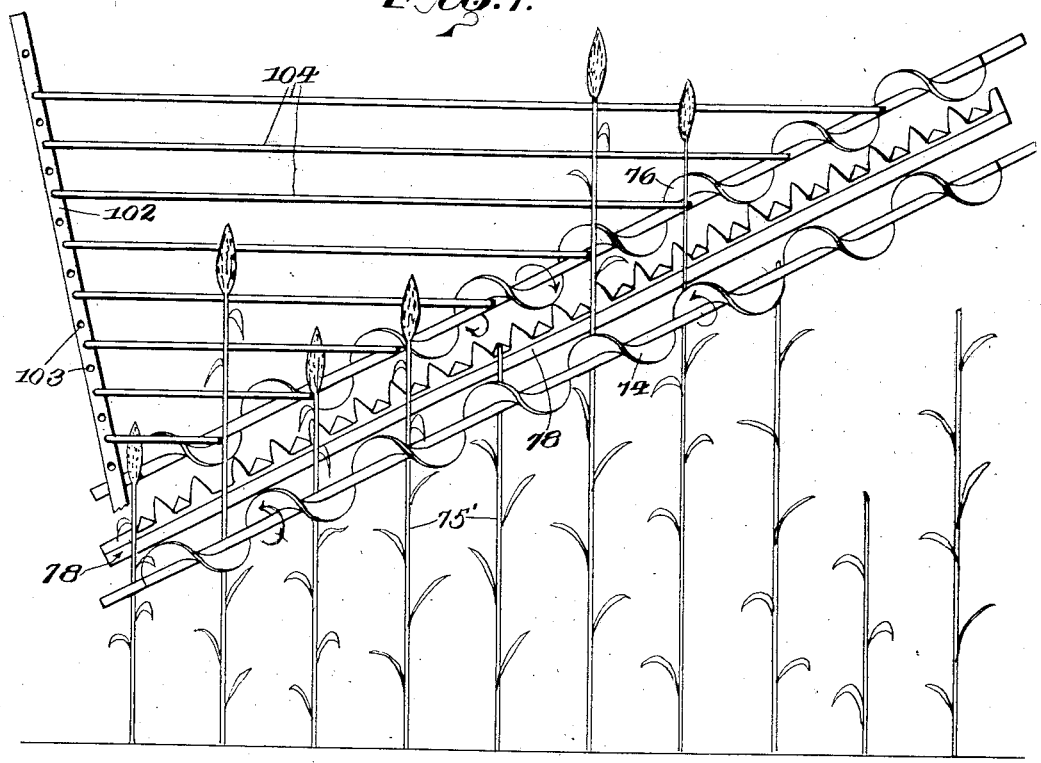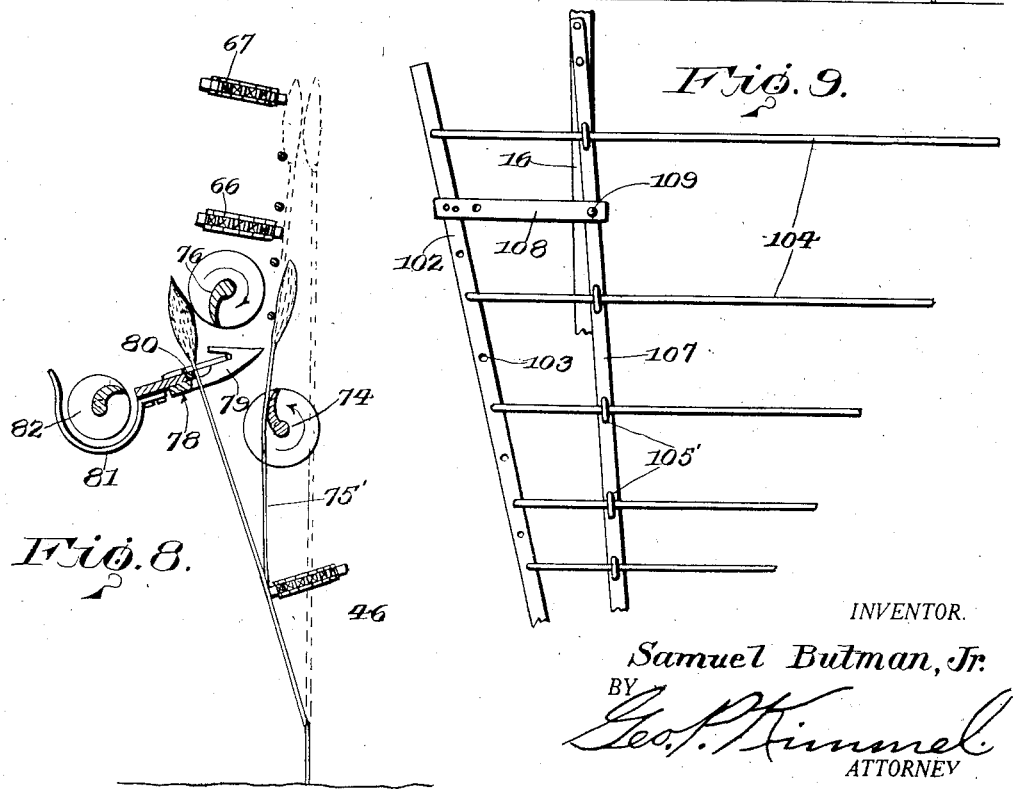

Patented Feb. 26, 1929.

1,703,721

UNITED STATES PATENT OFFICE.

SAMUEL BUTMAN, JR., OF MERKEL, TEXAS.

GRAIN HEADER.

Application filed July 14, 1927. Serial No. 205,633.

This invention relates to a grain header designed primarily for heading sorghum, but it is to be understood that a header, in accordance with this invention, may be employed in any connection for which it is found applicable, and the invention has for its object to provide, in a manner as hereinafter set forth, a machine of such class having means for controlling the stalks of a row in a manner whereby, during the travel of the machine, each stalk of the row will be severed in close proximity to the head thereof and the severed heads conveyed off from the machine.

A further object of the invention is to provide, in a manner as hereinafter set forth, a grain header machine including means for controlling the point of severance of the heads of stalks of different heights and with the severance point for each stalk being in close proximity to the head whereby but a small portion of the stalk will be carried by each of the severed heads.

Further objects of the invention are to provide, in a manner as hereinafter set forth, a grain header which is comparatively simple in its construction and arrangement, strong, durable, compact, thoroughly efficient in its use, automatic in its action, readily assembled, and comparatively inexpensive to set up and operate.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 2 is a top plan view thereof partly broken away.

Figure 3 is a fragmentary view in side elevation.

Figure 4 is a framentary view in section illustrating a driving mechanism operated from one of the supporting wheels of the machine.

Figure 5 is a detail of the driving means for one of the endless tensioning devices for the stalks of a row.

Figure 6 is a fragmentary view illustrating a supporting means for the guard rail.

Figure 7 is a diagrammatic view illustrating the manner of controlling the point of severance of the stalks by the cutter bar.

Figure 8 is a sectional elevation from the front illustrating the manner of controlling the stalks to provide for the severing of the same in proximity to the heads thereof.

Figure 9 is a fragmentary view of the adjustable guard.

Figure 1:
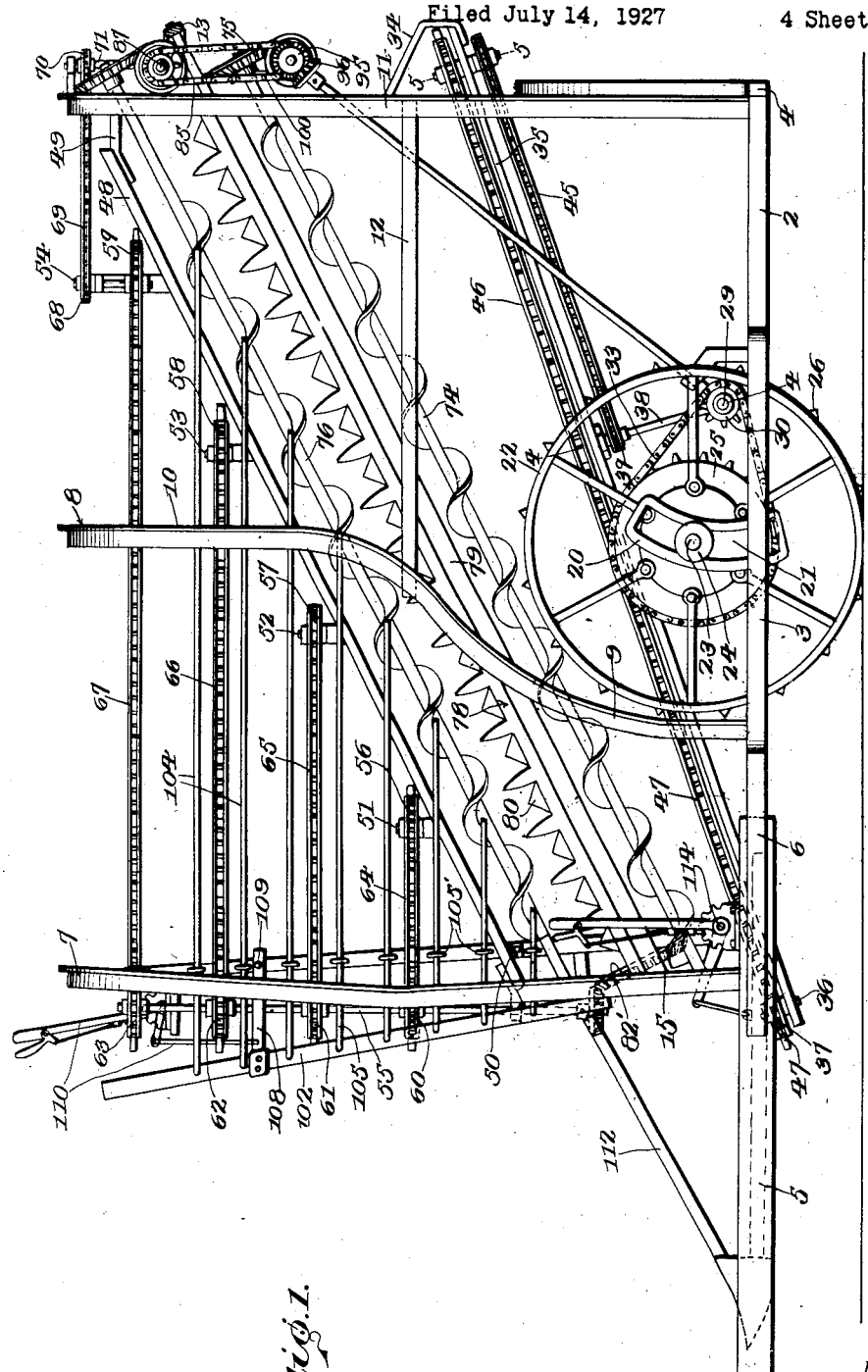
Figure 1 is a side elevation of a grain header machine in accordance with this invention.

The machine is illustrated as constructed for operation with respect to a single row of sorghum, but it is to be understood that it can be set up to operate simultaneously upon a double row. The machine can be transported in any suitable manner, by way of example horse drawn or by a motor vehicle.

Further the machine can also be set up as a wagon or tractor attachment.

The machine includes a supporting structure or body portion comprising a pair of side space bars 1, 2 of substantial length and the latter is formed intermediate its ends with a laterally extending outwardly disposed yoke shaped portion 3. Connected to the rear ends of the bars 1, 2 is a horizontally disposed arch-shaped rear base bar 4. Secured to and projecting forwardly from the base bar 2 is a traction tongue 5. The forward end of the base bar 2 is bifurcated as at 6 and the tongue 5 extends therein and holdfast devices 7' fixedly secure the tongue 5 to the forward portion 6 of the bar 2. Secured upon the forward end of the bar 1 and upon the tongue 5 in proximity to the forward end of the bar 2 is an upstanding forward yoke 7. Secured to the bar 2 at the forward end of the lateral portion 3 and to the bar 1 approximately centrally thereof is an upstanding intermediate yoke 8 which has that arm thereof which is secured to the bar 2 arranged forwardly of that arm which is secured to the bar 1. That arm of the yoke 8 which is secured to the bar 2 is indicated at 9 and has its upper portion 10 offset rearwardly with respect to its lower portion. Secured to the rear ends of the bars 1, 2 is an upstanding rear yoke 11. The arm 9 of the yoke 8 is connected to the yoke 11 by a side bar 12. The arms of the yoke 11, have secured thereto, in proximity to their upper ends, a rearwardly extending and upwardly inclined yoke shaped bracket 13. The arms of the forward yoke are indicated at 14, 15 and secured to and extending inwardly from the arm 14, at the lower portion thereof is a transverse support 16' to which is secured a vertically disposed bar 16 and the latter is also suitably secured to the arm 14. Secured to the inner face of the arm 15, above the lower end thereof is a transversely extending support 17.

Carried by the base bar 1 is an axle supporting means 18 for the axle of one of the supporting wheels 19 for the machine body. Fixed to the lateral portion 3 of the base bar 2, and extending upwardly therefrom is an axle supporting member 20 formed with an arcuate slot 21. The other supporting wheel for the machine body is indicated at 22 and is carried by an axle 23 mounted in a carrier or bearing 24 capable of being adjusted in the slot 21. The wheel 22 is provided on its inner face with a sprocket gear 25. The wheels 19 and 22 revolve on their supporting axles and can be provided with traction shoes, as illustrated at 26 with respect to the wheel 22.

Secured to the bar 2, at the rear thereof and extending inwardly therefrom is a supporting bracket 27 and secured to the inner face of one of the side arms of the yoke 11 is an inwardly extending bracket 28. Journaled in the bracket 27 is a counter shaft 29 provided at its outer end with a sprocket pinion 30, intermediate its ends with a beveled gear 31 and at its outer end with a beveled gear 32. The shaft 29 is driven from the wheel 22 and for such purpose an endless belt 33 is provided which is operated from the sprocket gear 25 and is in engagement with and operates the sprocket pinion 30.

Connected with the rear yoke 11 is a hanger 34 for supporting the rear end of a board 35 and the latter extends from the yoke 11 to and slightly forward of the yoke 7 and inclines downwardly from rear to front and has its forward end connected in any suitable manner to the support 17. The board 35, at its forward end is provided with an upstanding forwardly inclined shaft 36 carrying a sprocket pinion 37 positioned above or rather over the board 35. Extending into a bearing 39 supported in any suitable manner below and intermediate the ends of the board 39 is a forwardly inclined, upstanding shaft 38, which has fixed thereto near its upper end a sprocket pinion 40 and its lower end carries a beveled pinion 41 which meshes with and is driven from the beveled pinion 32. The board 35 is supported in a manner to be perfectly free to move in or out in order to vary tension on the stalks. Extending through the board 35 at the rear thereof is a forwardly inclined shaft 42 which has fixed to its upper end a sprocket pinion 43 and which also has fixed to its lower end a sprocket pinion 44. The pinion 44 is driven from an endless belt 45 operated from the sprocket pinion 40. Traveling around the pinions 37, 43, and driven from the sprocket pinion 43 is an endless tension applying element 46 in the form of a sprocket chain having laterally extending spaced stalk positioning members 47. The element 46 is employed for shifting and applying tension on the stalks and the reason therefor will be hereinafter referred to.

The element 46 extends downwardly at an inclination from rear to front and the width thereof is greater than the width of the board 35.

Arranged above the element 46 and disposed at a downward inclination from the rear to the front thereof is a board 48 supported at its rear end, as at 49 from the yoke 11 in proximity to the upper end thereof. The forward or lower end of the board 48 is supported from the bar 16, as at 50. Secured to the bar 48 and extending upwardly therefrom are spaced vertically disposed shafts 51, 52, 53 and 54. The shaft 54 is of greater height than the other of the shafts 51, 52, and 53. The board 48 projects slightly in advance of the yoke 7 and has mounted in its forward end a vertically disposed shaft 55 which has its upper end, supported in any suitable manner from the bar 16. Carried by the shafts 51, 52, 53 and 54 are respectively sprocket pinions 56, 57, 58 and 59. Carried by the shaft 55 are superposed spaced sprocket pinions 60, 61, 62 and 63 which align respectively with the pinions 56, 57, 58 and 59. Traveling around the pinions 56, 60 is a tension applying or shifting element 64, for the stalks and is constructed in the same manner and acts to maintain the stalks clear of the cutter until they reach the proper height with respect to the cutter. Traveling around the pinions 57, 61 is an endless tension applying or shifting element 65 for the stalks similar to the element 64 and for the same purpose. Traveling around the pinions 58, 62 is a tension applying or shifting element 66 for the same purpose as the element 65 and traveling around the pinions 59, 63 is a tension applying or shifting element 67 for the same purpose as the element 66. The element 46 is of greater length than any of the other tension applying or shifting elements. The element 64 is of less length than the element 65, and the latter is of less length than the element 66, and the latter is of less length than the element 67. The upper end of the shaft 54 is provided with a sprocket pinion 68, driven from an endless belt 69 operated from a sprocket pinion 70 carried on the upper end of a shaft 71 supported by a bracket 72 connected with the yoke 11. The lower end of the shaft 71 is provided with a beveled gear 73. The operation of the belt 69 provides for the travel or operation of the elements 64, 65, 66 and 67. The element 67 is driven from the pinion 59, and the engagement of the element 67 with the pinion 63 provides for the operation of the shaft 55, which in turn will drive the pinions 60, 61, 62 thereby operating the element 64, 65 and 66. The elements 64, 65, 66 and 67 extend from the forward end of the machine body to a point adjacent the rear end thereof.

Arranged above the element 46, a substantial distance above the latter and also below and spaced from the element 64 is a rotatable holder element 74 of spiral form and which has its forward end suitably supported from the support 17 and its rear end suitably supported from the yoke 11. The holder element 74 is what is termed the lower holder element, inclines downwardly from rear to front and has its rear end provided with a beveled gear 75. The axis of the element 74 is positioned inwardly with respect to the board 35. The element 74 provides means for holding the stalks 75' against the guard rails of the guard element and also to act with the element 46 to apply tension on the stalks. The element 74 also coacts with the elements 64, 65, 66 and 67 and these latter elements are arranged to one side of the elements 46 and 74 see Figure 8. The stalks 75, when the machine is operated pass between the guard element to be presently referred to and the elements 46 and 74 see Figure 8.

Arranged above and to one side of the holder element 74 is a holder element 76 of spiral form and which inclines downwardly from rear to front. The element 76 is supported at its forward end in any suitable manner from the support 15 and has its rear end supported in any suitable manner from the yoke 11. The rear end of the element 76 is provided with a beveled gear 77. The element 74 is positioned below and in proximity to the elements 64, 65, 66 and 67 and is of a length to extend rearwardly from the element 67.

Arranged between the elements 74 and 76 and in close proximity to the element 76 is a cutter element 78 formed of a stationary portion 79 and a cutter bar 80. The element 78 inclines downwardly horizontally, see Figure 8 and to the stationary part 79 of the cutter element 68 is secured a trough 81 in which operates a rotatable spiral conveyor 82. The cutter element 78, trough 81 and conveyor 82 incline downwardly from rear to front. The lower or forward end of the cutter element 78 is suitably connected with or supported from the bar 16 and the rear end is suitably supported from the bracket 13 and the yoke 11. The conveyor 82 has its forward end suitably supported from the bar 16 and its rear end suitably supported from the yoke 11 and bracket 13. The conveyor 82 is driven from its forward end by a driving connection 82' between such end and the lower end of shaft 55, see Figure 1.

The cutter bar 80 is reciprocated by an actuating member or crank arm 83 which is eccentrically connected to a disc 84 carried on one end of a shaft 85, which is supported from the bracket 13 and provided intermediate its ends with a beveled gear 86 and at its other end with a sprocket pinion 87. The gear 86 meshes with the gear 77 for operating the upper holder element 76. Supported from the bracket 13 is a shaft 88 provided at one end with a disk 89 to which the member or arm 83 is eccentrically connected whereby the shaft 88 will be driven by and simultaneously with the shaft 85. The shaft 88 carries a beveled pinion 90 which meshes with the beveled pinion 73 for driving the shaft 71. A transmission shaft is indicated at 94 which is supported from the bracket 12 and carries a beveled pinion 95, driven from a beveled pinion 96, carried on the upper end of an upstanding, rearwardly inclined shaft 97, the latter having its lower end provided with a beveled pinion 98, see Figure 2, which is driven from the beveled pinion 31 on the shaft 29. The shaft 94 carries a sprocket pinion 99 for driving an endless belt 100 which engages with the sprocket pinion 87 for the purpose of operating the shaft 85. The shaft 94 intermediate its ends carries a beveled gear 101, which meshes with the beveled gear 75 for the purpose of driving the element 74.

Coacting with the holder and tension applying elements for the stalks 75' is a guard element consisting of an upstanding, forwardly inclined coupling bar 102 provided throughout with spaced openings 103. The bar 102 is provided for coupling a series of superposed, spaced guard rails 104 and each of which includes a forward terminal portion formed of a horizontally inclined part 105 and a right angular part 106 which extends an opening 103. The parts 105 of the rails 104 are arranged in superposed alignment and the parts 106 are arranged one in advance of the other, see Figure 2. The guard rails 104 progressively increase in length from the lower rails to the upper rails, see Figure 7. The elements 64, 65, 66 and 67 are positioned in spaced relation with respect to a pair of guard rails and project to one side thereof. The lower guard rails are arranged between the element 76 and the elements 74 and 46, see Figure 8. The guard rails are also positioned between the cutter element 78 and the holder element 74 see Figure 8. The guard rails extend longitudinally of lengthwise from the machine. Each guard rail 104 extends through an eye 105, see Figure 6, carried on the inner end of an arm 106 which is connected to an inclined rod 107 secured to the bar 16. The eye 105 is of greater diameter than the guard rail 104 which permits of the rails tilting in the eyes to enable the elevating or lowering of the inner free ends of the rails and also to dispose the rails at different inclinations as well as to retain the rails in a straight position if desired. For the purpose of tilting the guard elements to change the position of the rails 104, the coupling bar 102, carries an arm 108, which is pivotally connected as at 109 to the rod 107 and fastened to the arm 108 is a shifting mechanism 110 therefor which is suitably supported from the yoke 7 see Figure 1. The shifting mechanism provides means for elevating and lowering the coupling bar 102 whereby the guard rails can be adjusted to the desired position. The guard rails, with reference to Figure 7, will maintain the stalks 75' clear of the cutter element until the stalks pass off of the inner end of the rail, at which time the head will bear against the holder element 76 and eventually the head will pass clear of said element 76 and the elements 74 and 46 will then force the stalks to the position shown in Figure 8 whereby the cutter element will sever the stalks in proximity to the heads and the latter will fall into the trough 81 and discharged therefrom by the conveyor 82. The operation of the machine, to sever the stalk in close proximity to the head, is shown in full and dotted lines in Figures 7 and 8.

Pivotally connected to the machine body and projecting forwardly therefrom are stalk lifters or erectors 111 and 112, and which are pivoted at their rear ends, as at 113 to the yoke 11. Means for adjusting the lifters or erectors, which are termed snoots, is indicated at 114 and can be of any suitable construction. The lifters or erectors will elevate the bent-over stalks and as the machine travels forward the stalk will be engaged by a member 47 on the element 46 or the member 47 on the other tensioning elements and be maintained in an upright position.

The upper holder 76 will prevent the stalks from being severed until the head of the latter passes off of the same. When the stalk passes off of the end of the guard rails it engages the upper holder and will eventually clear the same, owing to the upward inclination of the holder, but it is held in engagement with the upper holder 76, by the lower holder 74 and the lower tension applying element 46, until the head of the stalk passes clear of the holder 76 when the holder 74 and element 46 will act to shift the stalk to the position shown in Figure 8 to be engaged by the cutter bar.

The guard element, holder element, and tension applying elements, are set up in a manner to prevent the stalk from being cut, to remove the head therefrom, until the head passes clear of the holder 76 and the cutter element 78 is so positioned as to act upon the stalk in proximity to the head.

It is thought the many advantages of a machine in accordance with this invention, for the purpose set forth, can be readily understood, and although the preferred embodiment of the invention is as illustrated and described, yet it is to be understood that changes in the details of construction can be had which fall within the scope of the invention as claimed.

What I claim is:

1. A machine for the purpose set forth comprising a cutter element including a stationary part and reciprocatory bar, said cutter element providing means for severing the heads of stalks of different heights, and means for controlling the position of the point of severance of each of the stalks, said controlling means including rotatable spiral holders arranged in spaced relation, endless traveling stalk tensioning elements arranged in spaced relation with respect to each other and with respect to said holders, and spaced guide rails progressively increasing in length, arranged in spaced relation and coacting with said holders and tensioning element.

2. A machine for the purpose set forth comprising a cutter element including a stationary part and a reciprocatory bar, said cutter element providing means for severing the heads of stalks of different heights, means for controlling the position of the point of severance of each of the stalks, said controlling means including rotatable spiral holders arranged in spaced relation, endless traveling stalk tensioning elements arranged in spaced relation with respect to each other and with respect to said holders, and spaced guide rails progressively increasing in length, arranged in spaced relation and coacting with said holders and tensioning elements, said cutting element inclining downwardly from rear to front and said holders and tensioning elements inclining downwardly from rear to front.

3. A machine for the purpose set forth comprising a cutter element including a stationary part and a reciprocatory bar, said cutter element providing means for severing the heads of stalks of different heights, means for controlling the position of the point of severance of each of the stalks, said controlling means including rotatable spiral holders arranged in spaced relation, endless traveling stalk tensioning elements arranged in spaced relation with respect to each other and with respect to said holders, spaced guide rails progressively increasing in length, arranged in spaced relation and coacting with said holders and tensioning elements, said cutting element inclining downwardly from rear to front and said holders and tensioning elements inclining downwardly from rear to front, and a conveyor means secured to the stationary part of said cutter element for conveying off the severed heads.

4. In a machine for the purpose set forth, a cutter element for uniformly severing the heads of stalks of different heights, means for controlling the position of the point of severance of each of the stalks, said cutter element and said means inclining downwardly from rear to front, and stalk lifting means arranged forwardly of said cutter element and means.

5. A machine for the purpose set forth comprising an inclined cutter element for severing the heads of stalks of different heights, upper and lower inclined stalk holders positioned above and below said element, a series of superposed, spaced stalk tensioning elements progressively increasing in length upwardly and arranged above the upper holder, a lower inclined stalk tensioning element positioned below the lower holder, and superposed spaced guard rails progressively increasing in length upwardly and arranged to extend to said upper holder, said holders, tensioning elements and guard rails providing means for controlling the point of severance of each of the stalks acted upon by the cutter.

6. A machine for the purpose set forth comprising an inclined cutter element for severing the heads of stalks of different heights, upper and lower inclined stalk holders positioned above and below said element, a series of superposed, spaced stalk tensioning elements progressively increasing in length upwardly and arranged above the upper holder, a lower inclined stalk tensioning element positioned below the lower holder, superposed spaced guard rails progressively increasing in length upwardly and arranged to extend to said upper holder, said holders, tensioning elements and guard rails providing means for controlling the point of severance of each of the stalks acted upon by the cutter, and stalk lifting means arranged forwardly of said rails, cutter and tensioning elements and holders.

7. A machine for the purpose set forth comprising an inclined cutter element for severing the heads of stalks of different heights, upper and lower inclined stalk holders positioned above and below said element, a series of superposed, spaced stalk tensioning elements progressively increasing in length upwardly and arranged above the upper holder, a lower inclined stalk tensioning element positioned below the lower holder, superposed spaced guard rails progressively increasing in length upwardly and arranged to extend to said upper holder, said holders, tensioning elements and guard rails providing means for controlling the point of severance of each of the stalks acted upon by the cutter, and means connected with the cutter element for conveying off the severed heads.

8. A machine for the purpose set forth comprising an inclined cutter element for severing the heads of stalks of different heights, upper and lower inclined stalk holders positioned above and below said element, a series of superposed, spaced stalk tensioning elements progressively increasing in length upwardly and arranged above the upper holder, a lower inclined stalk tensioning element positioned below the lower holder, and superposed spaced guard rails progressively increasing in length upwardly and arranged to extent to said upper holder, said holders, tensioning elements and guard rails providing means for controlling the point of severance of each of the stalks acted upon by the cutter element, said tensioning elements being in the form of endless traveling belts, said holders being of spiral form, and means for simultaneously rotating said holders and for imparting traveling movement to said elements.

In testimony whereof, I affix my signature hereto.

SAMUEL BUTMAN, Jr.